(12) United States Patent
Sant et al.

(10) Patent No.: US 12,435,006 B2
(45) Date of Patent: Oct. 7, 2025

(54) ARMOR PLATING MADE OF FINE-GRAIN BORON CARBIDE AND SILICON CARBIDE

(71) Applicant: SAINT-GOBAIN CENTRE DE RECHERCHES ET D'ETUDES EUROPEEN, Courbevoie (FR)

(72) Inventors: Jérôme Sant, Les Angles (FR); Jérôme Brulin, Saint-Martin-de-Crau (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 581 days.

(21) Appl. No.: 17/787,048

(22) PCT Filed: Dec. 18, 2020

(86) PCT No.: PCT/FR2020/052558
§ 371 (c)(1),
(2) Date: Jun. 17, 2022

(87) PCT Pub. No.: WO2021/123683
PCT Pub. Date: Jun. 24, 2021

(65) Prior Publication Data
US 2023/0034822 A1   Feb. 2, 2023

(30) Foreign Application Priority Data
Dec. 20, 2019   (FR) ...................... 1915155

(51) Int. Cl.
*B32B 9/00*   (2006.01)
*B32B 1/08*   (2006.01)
(Continued)

(52) U.S. Cl.
CPC .............. *C04B 35/565* (2013.01); *B32B 1/08* (2013.01); *B32B 3/04* (2013.01); *B32B 5/02* (2013.01);
(Continued)

(58) Field of Classification Search
CPC .......... C04B 35/565; C04B 35/64; B32B 3/04
(Continued)

(56) References Cited

U.S. PATENT DOCUMENTS 3,796,564 A   3/1974   Taylor et al.
3,857,744 A   12/1974   Moss
(Continued)

FOREIGN PATENT DOCUMENTS

EP   2 998 282 A1   3/2016
FR   3053776 A1 *   1/2018   ........... F41H 5/0428
(Continued)

OTHER PUBLICATIONS

International Search Report as issued in International Patent Application No. PCT/FR2020/052558, dated Apr. 20, 2021.
(Continued)

*Primary Examiner* — Daniel H Miller
(74) *Attorney, Agent, or Firm* — Pillsbury Winthrop Shaw Pittman LLP

(57) ABSTRACT

An antiballistic armor-plating component, includes a ceramic body made of a material comprising, as percentages by volume, between 35% and 55% of silicon carbide, between 20% and 50% of boron carbide, between 15% and 35% of a metallic silicon phase or of a metallic phase including silicon.

23 Claims, 1 Drawing Sheet

(51) Int. Cl.
- *B32B 3/04* (2006.01)
- *B32B 5/02* (2006.01)
- *B32B 15/18* (2006.01)
- *B32B 18/00* (2006.01)
- *B32B 27/32* (2006.01)
- *B32B 27/34* (2006.01)
- *C04B 35/563* (2006.01)
- *C04B 35/565* (2006.01)
- *C04B 35/626* (2006.01)
- *C04B 35/64* (2006.01)
- *C04B 35/653* (2006.01)
- *C04B 41/45* (2006.01)
- *C04B 41/48* (2006.01)
- *C04B 41/51* (2006.01)
- *C04B 41/83* (2006.01)
- *C04B 41/88* (2006.01)
- *B32B 7/12* (2006.01)
- *F41H 5/04* (2006.01)

(52) U.S. Cl.
CPC .............. *B32B 15/18* (2013.01); *B32B 18/00* (2013.01); *B32B 27/32* (2013.01); *B32B 27/34* (2013.01); *C04B 35/563* (2013.01); *C04B 35/6264* (2013.01); *C04B 35/62655* (2013.01); *C04B 35/64* (2013.01); *C04B 35/653* (2013.01); *C04B 41/4596* (2013.01); *C04B 41/4861* (2013.01); *C04B 41/4892* (2013.01); *C04B 41/5144* (2013.01); *C04B 41/83* (2013.01); *C04B 41/88* (2013.01); *B32B 7/12* (2013.01); *B32B 2250/40* (2013.01); *B32B 2255/205* (2013.01); *B32B 2255/26* (2013.01); *B32B 2307/536* (2013.01); *B32B 2307/72* (2013.01); *B32B 2307/732* (2013.01); *B32B 2571/02* (2013.01); *C04B 2235/3821* (2013.01); *C04B 2235/3826* (2013.01); *C04B 2235/425* (2013.01); *C04B 2235/428* (2013.01); *C04B 2235/5436* (2013.01); *C04B 2235/5445* (2013.01); *C04B 2235/616* (2013.01); *C04B 2235/6581* (2013.01); *C04B 2235/77* (2013.01); *C04B 2235/786* (2013.01); *F41H 5/0414* (2013.01)

(58) Field of Classification Search
USPC ........................................................ 428/408
See application file for complete search history.

(56) References Cited

U.S. PATENT DOCUMENTS

| | | |
|---|---|---|
| 4,415,632 A | 11/1983 | Luhleich et al. |
| 4,604,249 A | 8/1986 | Luhleich et al. |
| 6,609,452 B1 | 8/2003 | McCormick et al. |
| 6,862,970 B2 | 3/2005 | Aghajanian et al. |
| 2003/0110931 A1 | 6/2003 | Aghajanian et al. |
| 2011/0314997 A1 | 12/2011 | Carberry et al. |
| 2013/0168905 A1 | 7/2013 | Anderson et al. |
| 2016/0356576 A1 | 12/2016 | Cherevatsky et al. |

FOREIGN PATENT DOCUMENTS

| | | |
|---|---|---|
| IL | 188517 A | 2/2016 |
| JP | 2005-247622 A | 9/2005 |
| RU | 2 621 241 C1 | 6/2017 |
| WO | WO 2021/023671 A1 | 2/2021 |

OTHER PUBLICATIONS

Song, W., et al., "Effect of boron carbide on the liquid silicon infiltration and performance enhancement of reaction-bonded silicon carbide composites," Materials Research Express, vol. 6, No. 9, Jul. 2019, XP055793122, 12 pages, Retrieved from the Internet: URL:https://iopscience.iop.org/article/10.1088/2053-1591/ab30eb>.

\* cited by examiner

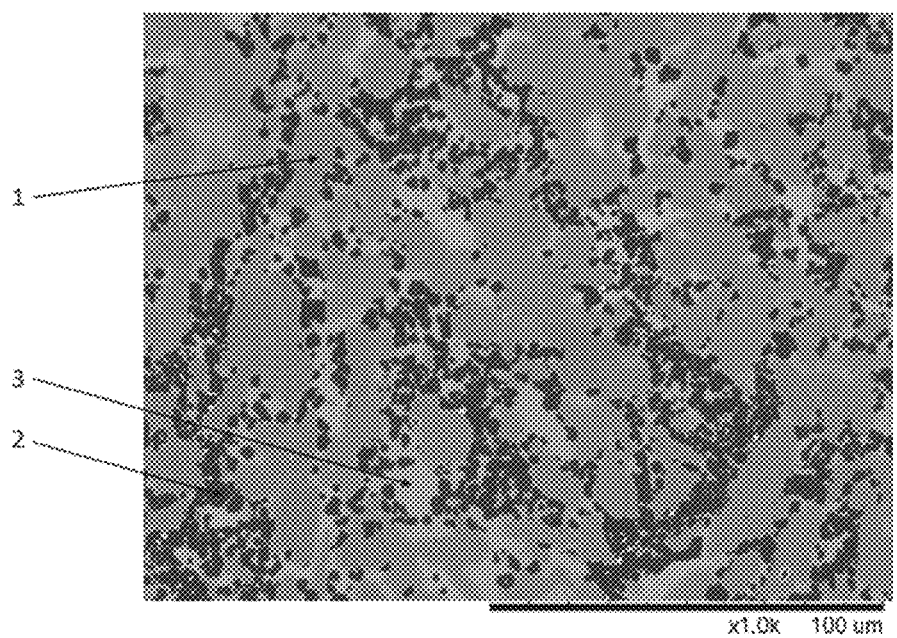

ARMOR PLATING MADE OF FINE-GRAIN BORON CARBIDE AND SILICON CARBIDE

CROSS-REFERENCE TO RELATED APPLICATIONS

This application is the U.S. National Stage of PCT/FR2020/052558, filed Dec. 18, 2020, which in turn claims priority to French patent application number 1915155 filed Dec. 20, 2019. The content of these applications are incorporated herein by reference in their entireties.

The invention relates to products whose antiballistic properties are high enough to justify their use in armor or armor-plating components.

The invention is in particular applicable to armor or armor-plating components that make it possible to protect people, (land, sea or air) vehicles or fixed installations (in particular buildings, enclosure walls or guard posts).

In particular, the additional weight linked to wearing armor plating is an essential element, whether it concerns the protection of people but also with regard to vehicles, for which excessive weight is an obstacle to rapid movement and limits their radius of action.

In particular, systems are known that are formed by the "mosaic" assembling of ceramic parts having a given polygonal shape and that are individually resistant to the impact of a projectile. JP2005247622 describes, for example, an arrangement of such shapes 20 to 100 mm in width, for a thickness of a few mm. This type of mosaic of parts has the advantage of withstanding successive shots ("multi shot" or "multi-hit" protection).

Other systems, referred to as monolithic systems, exist, these systems being formed of one piece or else of a very limited number of pieces having a large area, each monolith having an impact area that is larger than 100 cm$^2$, thereby decreasing the number of joints.

A number of materials have been proposed for forming armor intended for people, the ratio of armor-plating mass to protective area of which must remain low, typically lower than 50 kg/m$^2$, or non-personnel armor plating intended for vehicles or for fixed installations, the ratio of mass to protective area (or surface density) of which is typically higher than 50 kg/m$^2$.

Metals and alumina are commonly used as armor plating but they have a high surface density.

More recently, products based on non-oxide ceramic have been proposed, of which the mass to armor-plating area or surface density at equivalent impact resistance is lower.

Porous SiC products that can be used as armor plating are known, for example, from U.S. Pat. No. 4,604,249 or U.S. Pat. No. 4,415,632.

Also known are armors made of a composite ceramic material formed of fine grains of boron carbide bound by a silicon carbide matrix obtained by reactive sintering, in particular by impregnation of molten silicon.

U.S. Pat. No. 3,796,564 and then U.S. Pat. No. 53,857,744 or IL18517 disclose, for example, methods of manufacturing a reaction bonded B4C composite armor consisting in pressing a part from a mixture of B4C grains of 1 to 120 micrometers and resin or a carbon precursor, then infiltrating this part with molten silicon between 1440° C. and 2200° C. under vacuum or under an inert atmosphere. The final product is a composite comprising grains of boron carbide in a silicon matrix that includes silicon carbide obtained by reacting a portion of the molten silicon with the boron carbide and the carbon of the resin. This type of product is difficult to manufacture because the production process is complex. In particular due to the strong reaction of molten silicon with the B$_4$C grains on the one hand (leading in particular to a secondary B$_{12}$(B, C, Si)$_3$ boron carbide phase) and with the free carbon on the other hand (leading in particular to a β-sic phase). It was more recently proposed by US 2013/0168905 A1 to infiltrate the preform with silicon and boron.

Other patents, such as for example U.S. Pat. No. 6,609,452B1 or U.S. Pat. No. 36,862,970B2, have proposed other solutions, but these are armors comprising SiC grains bonded by a metallic silicon phase. The ballistic performance of this type of composite with a similar surface density appeared to be lower than a composite with B$_4$C grains bonded by a metallic silicon phase.

There is therefore a continual need to improve the products used as armor plating, this improvement being measured in particular by their ballistic performance. The object of the present invention is therefore to provide a boron carbide material bound by a matrix comprising essentially metallic silicon or a metallic silicon alloy and silicon carbide grains, the ballistic performance of which is improved.

In particular, there is today a need for armor plating capable of withstanding perforation with respect to projectiles having high kinetic energy while having a low bulk density, typically less than 3.1 g/cm$^3$ less than 3.0 g/cm$^3$, in order to protect people or (land, sea or air) vehicles or fixed installations, such as buildings.

According to a first general aspect, the present invention relates to an antiballistic armor-plating component, preferably having an impact area, in particular that is flat or curved, and comprising a ceramic body made of a material described as hard. The ceramic body is generally provided on its inner face or face opposite the impact face with an energy-dissipating back coating, preferably made of a material of lower hardness than that of the material constituting the ceramic body.

More specifically, the present invention relates co an antiballistic armor-plating component, comprising a ceramic body made of a material comprising, as percentages by volume:

between 35% and 55% of silicon carbide,
between 20% and 50% of boron carbide,
between 15% and 35% of a metallic silicon phase or of a metallic phase comprising silicon, and wherein, as percentages by volume of said material:

the boron carbide Grains with an equivalent diameter greater than 30 micrometers represent less than 5%, preferably less than 2%; more preferably there are no boron carbide grains with an equivalent diameter greater than 30 micrometers, the boron carbide grains with an equivalent diameter less than 5 micrometers represent more than 15% and less than 35%, the silicon carbide grains with an equivalent diameter greater than. 30 micrometers represent less than 5%, preferably less than 1%; more preferably there are no silicon carbide grains with an equivalent diameter greater than 30 micrometers, the silicon carbide grains with an equivalent diameter greater than or equal to 5 micrometers and less than or equal to 30 micrometers represent between 35% and 55%.

According to the invention, the metallic phase is advantageously present between the grains of boron carbide and of silicon carbide. As indicated above, the metallic phase comprises silicon and more preferably is based on silicon. In particular, it preferably comprises more than 50 at % of silicon, preferably more than 80% or even more than 90% of silicon atoms. More preferably, the metallic phase consists essentially of silicon, or consists solely of silicon, apart from the inevitable impurities.

According to the present invention, the ceramic material constituting the ceramic body is in principle not porous. However, according to certain embodiments, said material may have a porosity which in principle does not exceed 5% by volume, or which does not exceed 1% by volume, as measured by porosimetry, calculated according to the ratio expressed as a percentage of the bulk density measured according to ISO18754 to the true density measured according to ISO5018.

Whatever the porosity of the material, according to the present invention, the percentages by volume of the various constituents of the material are given excluding porosity.

The contents of boron carbide, silicon carbide and metallic silicon phase or metallic phase (s) containing silicon in the material are obtained by ray diffraction, according to techniques well known in the art.

Boron carbide is understood to mean the sum of all the detectable crystalline forms, in particular detectable by X-ray diffraction, present in the material and comprising boron and carbon, in particular $B_4C$ but also the forms, in particular resulting from the high-temperature reaction thereof with silicon compounds, in particular the $B_{12}(B,C,Si)_3$ phase.

Equivalent grain diameter in the material according to the invention is understood to mean the diameter of a sphere of the same volume as that measured for said grain. It is preferably determined by microtomography. The tomography analysis also makes it possible to obtain the volume distribution of the grains, as a percentage of the volume of material analyzed, as illustrated in FIG. 1 and explained in more detail in the remainder of the description.

In the armor-plating component according to the invention, according to preferred characteristics of the present invention:

Said ceramic body is monolithic and has an impact area greater than 100 cm², a thickness greater than 3 mm and a bulk density less than 3.0 g/cm³, for example between 2.5 and 3.0 g/cm³.

Said material constituting the ceramic body comprises boron carbide grains and silicon carbide grains bound by a matrix, said matrix comprising a metallic silicon phase or a metallic phase comprising silicon, in particular in the form of an alloy of silicon with one or more other metallic elements, preferably a metallic silicon matrix.

Said silicon carbide grains with an equivalent diameter greater than or equal to 5 micrometers and less than or equal to 30 micrometers represent more than 40% by volume of said material, and preferably less than 50% by volume of said material.

Said boron carbide grains with an equivalent diameter less than 5 micrometers represent more than 16% and less than 35% by volume of said material, and more preferably between 20% and 30% by volume of said material.

The boron carbide grains with an equivalent diameter between 5 and 30 micrometers, limits included, represent less than 10% by volume of said material, or less than 7% by volume of said material and preferably less than 5% by volume of said material, or less than 1% by volume of said material, or even said material does not have any grains with an equivalent diameter between 5 and 30 micrometers.

The boron carbide grains with an equivalent diameter greater than or equal to 5 micrometers represent less than 10% by volume of said material, preferably less than 5% by volume of said material, or less than 1% by volume of said material, or even said material does not have any grains with an equivalent diameter greater than or equal to 5 micrometers. According to one possibility, said material does not have any boron carbide grains with an equivalent diameter greater than or equal to 5 micrometers.

The silicon carbide grains with an equivalent diameter less than 5 micrometers represent less than 10% by volume of said material, preferably less than 7% by volume of said material. According to one possibility, said material has between 0% and 7%, preferably between 2% and 7% of silicon carbide grains with an equivalent diameter less than 5 micrometers.

The remainder of the volume of said material is taken up by said metallic silicon phase or said metallic phase comprising silicon.

Said material constituting the ceramic body comprises boron carbide grains and silicon carbide grains bound by a matrix comprising at least one metallic silicon phase or metallic phase comprising silicon.

The silicon carbide grains with an equivalent diameter greater than or equal to 5 micrometers are in alpha (α) crystallographic form.

The proportion by volume of $B_4C$ in said material represents less than 20% of the boron carbide content.

The boron carbide in said material is essentially present in the form of a $B_{12}(B,C,Si)_3$ phase.

The boron carbide, the silicon carbide and the metallic silicon or the metallic phase comprising silicon together represent more than 75%, by volume, of said material.

The silicon carbide grains with an equivalent diameter greater than. 30 micrometers represent less than 5%, preferably less than 1%.

More than 90%, preferably more than 95% of the grains and up to 100%, by volume of said material, have an equivalent diameter less than 30 micrometers.

More than 80% by volume of the grains with an equivalent diameter less than 5 micrometers, are boron carbide grains.

More than 80%, preferably more than 90%, or more than 95% by volume of grains with an equivalent diameter greater than or equal to 5 micrometers are silicon carbide (SiC) grains.

The metallic silicon phase or a metallic phase comprising silicon consists essentially of silicon (Si).

The free carbon content, measured by LECO analysis, is less than 1% by volume of said material. More precisely, the total carbon content measured by LECO analysis, from which is subtracted the content of bound carbon in the form of carbides, in particular silicon carbides and boron carbides including the SiC, $B_4C$ and $B_{12}$ $(B,C,Si)_3$ phases, the carbide contents being quantified by X-ray diffraction.

The volume content of silicon carbide in said material, measured by X-ray diffraction, is greater than 35%, more preferably greater than 40%, preferably greater than 45% of the crystalline phases present in said material.

The volume content of silicon carbide in said material, measured by X-ray diffraction, is less than. 55%, preferably less than 50% of the crystalline phases present in said material.

The volume content of boron carbide in said material, comprising the boron carbide phases $B_4C$ and $B_{12}(B,C,Si)_3$, measured by X-ray diffraction, is greater than. 20%, or even greater than or equal to 24%, of the crystalline phases present in said material constituting the ceramic body.

The volume content of boron carbide in said material, comprising the phases $B_4C$ and $B_{12}(B,C,Si)_3$, measured by X-ray diffraction, is less than 50%, preferably less than. 40%, or less than 30%, of the crystalline phases present in said material.

In particular, the volume content of phase $B_{12}(B,C,Si)_3$ in said material measured by X-ray diffraction, is greater than 15%, preferably greater than 20% and/or less than 40%, preferably less than 30%, of the crystalline phases present in said material.

The volume content of metallic silicon or of metallic phase comprising silicon, measured by X-ray diffraction, is greater than 15%, preferably greater than 20% and/or less than 35%, preferably less than 30%, more preferably less than 25%, of the crystalline phases present in said material.

The boron carbide, silicon carbide and metallic silicon or metallic phase comprising silicon together represent more than 50%, preferably more than 70%, more preferably more than 80%, or more than 90%, by volume, of the crystalline phases present in said material.

Said material constituting the ceramic body has a porosity (as measured as the ratio expressed as a percentage of the bulk density measured by ISO18754 (cf. page 22) to the true density measured according to ISO5018), of less than 3%, more preferably less than 2% or even less than 1%.

Said ceramic body has a bulk density of less than 2.95 g/cm$^3$, preferably less than 2.90 g/cm$^3$, or less than 2.85 g/cm$^3$.

Said ceramic body has an area greater than 150 cm$^2$, greater than 500 cm$^2$, or else greater than 1000 cm$^2$, Said ceramic body has a thickness greater than. 4 mm, more preferably greater than 5 mm and/or less than 50 mm, preferably less than 30 mm.

The ceramic body has a mass-to-area or surface density ratio, measured in kg/m$^2$, of less than 100, preferably of less than 50.

The ceramic body may have a flat surface or a surface with one or more curvatures. The ceramic body may be a simple or complex shape, solid or having a cavity, such as for example a tube. Preferably, the ceramic body is chosen from a plate, a the protector, a helmet, a bodywork element of a vehicle, a tube.

According to particular configurations of the armor-plating component according to the invention having given good results in ballistic tests, by volume of said material:

The silicon carbide (SiC) content of said material is greater than 40% and less than 55%, more preferably is greater than 45% and less than 55%.

The boron carbide content is greater than 20% and less than 40%, more preferably is greater than 20% and less than 30%.

The content of metallic silicon or of the metallic phase comprising silicon is greater than 15% and less than 35%, more preferably is greater than. 20% and less than 30%.

The boron carbide grains with an equivalent diameter less than 5 micrometers represent more than 20% and less than 50%, and more preferably represent more than 25% and less than 40% by volume of said material, the silicon carbide grains with an equivalent diameter between 5 micrometers and 30 micrometers, limits included, represent more than 40% and less than 80%, and more preferably represent more than. 45% and less than 70%, by volume of said material.

An antiballistic armor-plating component, having an impact area, in particular that is flat and/or curved, and comprising a ceramic body made of a hard material according to the invention, is advantageously provided on its inner face or face opposite the impact face with an energy-dissipating back coating, preferably made of a material of lower hardness than that of the material constituting the ceramic body.

The constituent material of the back coating is for example chosen from the polyethylenes PE, in particular ultra-high-density polyethylenes (UHMPE), glass or carbon fibers, aramids, metals such as aluminum, titanium or alloys thereof or steel.

The ceramic body-back coating assembly may be surrounded by an envelope of a confining material.

The constituent material of the envelope may be chosen from the polyethylenes PE, in particular ultra-high-density polyethylenes (UHMPE), glass or carbon fibers, aramids, metals such as aluminum or steel.

The invention also relates to the ceramic body, the features of which have just been described above, and in particular to a monolithic ceramic body in the form of a plate, having an area greater than 100 cm$^2$ and a thickness greater than 3 mm, a bulk density lower than 3.0 g/cm$^3$, consisting of a material as described above.

The invention also relates to the use of an armor-plating component comprising a ceramic body, the characteristics of which have just been described above, as antiballistic protection for a person, a vehicle (land, sea or air) or a fixed installation. (in particular a building, enclosure wall or guard post), in particular in the form of a plate, of a tile, of a mosaic, for example in the form of hexagons or nodules, of a chest protector, of a shield, of a helmet, of a bodywork element of a vehicle, such as a door, of a seat, of a tube.

Without having to repeat here, for the sake of conciseness, all of the technical features already described above in relation to the armor-plating range, a ceramic body according to the invention of course covers all of the same preferred embodiments.

The following designations and definitions are given, in connection with the preceding description of the present invention:

A hard material is understood in particular to mean a ceramic material with a Vickers hardness of greater than 15 GPa measured for example according to ASTM C1327, giving it in particular antiballistic properties.

The equivalent grain diameter in the material according to the invention is understood to mean the diameter of a sphere of the same volume as that measured for said grain. It is preferably determined by microtomography.

For example, a sample of dimensions 1.5×1.5×8 mm is scanned in a nanofocus tomograph so as to bring the sample as close as possible to the source and thus obtain a high resolution of the order of 1 μm$^3$/voxel. An acquisition time of about 3 h makes it possible to obtain a reconstruction with little noise. The volume image obtained consisting of different gray levels is binarized, for example using IMorph software, in order to individualize the grains, the metallic phase and the possible porosity. The identification of the grains may also be carried out by techniques such as a scanning electron microscope by backscattered electron analysis or by energy dispersive X-ray spectroscopy (EDS). From the volume of each grain, it is possible to produce a volume distribution of the grains as a percentage of the volume of material analyzed. (apart from its porosity). It is also possible to calculate the volume of the metallic phase as a percentage of the volume of material analyzed.

In the present application, the percentage by volume of grains is expressed relative to the volume of material excluding its porosity.

The bulk density of a product is understood, within the meaning of the present invention, to mean the ratio equal to the mass of the product divided by the volume that said product occupies. It is conventionally determined by the Archimedes method. ISO 18754 specifies for example the conditions for such a measurement.

A "matrix" of the ceramic body is understood to mean a crystalline or non-crystalline phase which provides a substantially continuous structure between the grains and which is obtained, during sintering or firing, from the constituents of the starting feedstock and potentially from the constituents of the gaseous environment of this starting feedstock. A matrix substantially surrounds the grains of the granular fraction, i.e. it coats them.

In a sintered ceramic body according to the invention, the grains bound by the matrix are essentially, or even exclusively, boron carbide grains and silicon carbide grains.

During sintering, they substantially retain the shape and the chemical properties that they had in the starting feedstock. In the sintered ceramic body, the matrix and the grains together represent 100% of the mass of the product.

A matrix obtained by reactive sintering exhibits distinctive features. In particular, during reactive sintering, carburization of the infiltration metal occurs. The resulting increase in volume, typically from 1% to 30%, advantageously makes it possible to compensate for the shrinkage caused by the sintering of the grains. The infiltration of silicon or alloys thereof also makes it possible to fill the porosity of the green preform.

The phase composition of the constituent material of the monolithic ceramic body is normally obtained by X-ray diffraction and Rietveld analysis.

The product according to the invention makes it possible in particular to protect against any type of projectile, for example a bullet, a shell, a mine or an element thrown out during the detonation of explosives, such as bolts, nails (or IED for "improvised explosive device") and normally constitutes an armor component for people or vehicles, generally in the form of modules such as plates.

According to the invention, the protective component conventionally comprises at least two layers: a first ceramic part such as described above combined with another, less hard and preferably ductile, material on the back face, conventionally referred as "backing", such as polyethylene (e.g.: Tensylon™, Dyneema®, Spectra™) fibers, aramid (e.g.: Twaron™, Kevlar®) fibers, glass fibers, or metals such as for example steel or aluminum alloys, in the form of plates. Adhesives, for example based on polyurethane or epoxide polymers, are used to bond the various constituent elements of the armor plate.

Under the impact of projectiles, the ceramic material fragments and its main purpose is to break the cores of the projectiles. The purpose of the back face, associated with the constituent ceramic material of the ceramic body, is to absorb the kinetic energy of the debris and to maintain a certain level of confinement on the ceramic plate, which is further optimized by the confining envelope.

A ceramic body according to the invention may in particular be obtained by means of a sintering process, in particular a reactive sintering process comprising the following steps:

a) preparing a starting feedstock including:
   at least one powder of boron carbide particles, of which the median diameter of the particles is between 0.1 and 10 micrometers,
   a powder of silicon carbide particles, of which the median diameter of particles is between 5 and 30 micrometers, preferably between 5 and 20 micrometers.
   a carbon precursor, preferably a powder of graphite or of non-crystalline or amorphous carbon, of which the median diameter is less than 1 micrometer,
   an aqueous solvent, in particular deionized water,
   preferably, shaping additives, b) shaping the starting feedstock into the form of preform, preferably by pressing;

c) removal from the mold after setting or drying;

d) optionally, drying the preform, preferably until the residual moisture content is comprised between 0 and 0.5% by weight;

e) loading the preform, in contact with a source of silicon or a silicon alloy, preferably in solid form, into a furnace;

f) firing the preform under an inert atmosphere, preferably under argon, or under vacuum, preferably under a residual pressure of less than 20 torr, preferably at a temperature between 1450° C. and 2200° C., so as to infiltrate the preform with the source of molten silicon and consolidate it.

Unless otherwise indicated, in the process according to the present description, all of the percentages are percentages by weight.

Preferably, the median diameter of the particles of the initial boron carbide powder is between 0.1 and 7 micrometers and more preferably is between 0.5 and 5 micrometers, especially between 0.2 and 5 micrometers. Preferably, the median diameter of the powder of silicon carbide particles is at least two times greater than the median diameter of the powder of boron carbide grains.

In such a process, use is made of a first initial silicon carbide powder, the median diameter of the particles of which is between .5 micrometers and 30 micrometers, limits included, and preferably between 7 and 20 micrometers, limits included. In certain advantageous embodiments, this silicon carbide powder has at least 10% of grains greater than 5 micrometers and less than 10% of grains greater than 20 micrometers.

According to a preferred embodiment, the starting feedstock comprises by mass:

from 40% to 55% of a powder of boron carbide particles, the median diameter of which is between 0.5 and 5 micrometers and preferably between 1 and 2 micrometers, and from 40% to 55% of a powder of silicon carbide particles, the median diameter of which is between 5 micrometers and 20 micrometers, limits included, and preferably between 7 and 15 micrometers.

According to a preferred embodiment, the starting feedstock comprises, by mass, at least 5%, or more than 7% and preferably less than 20%, preferably less than 15%, of a carbon precursor, preferably a powder of graphite or of non-crystalline or amorphous carbon. Such a content indeed advantageously makes it possible to obtain an optimum reaction with the metal, in particular silicon, during the infiltration in step f). The preceding relative proportions of boron carbide and silicon carbide particles making possible a sufficient wettability so as to allow the metal containing silicon to homogeneously impregnate the preform and to obtain a final structure having improved ballistic properties.

According to a preferred embodiment, the addition of additives and of carbon precursors is such that the free carbon content of the preform before firing, i.e. the content of unbound carbon in the form of a carbide, is between 5% and 15%, preferably less than 5% of the mass of said preform.

According to a preferred embodiment, the mixture is granulated or atomized until granules having a median diameter between 50 and 250 micrometers are obtained, the mixture typically having a moisture content of less than 5%, preferably less than 2%, or approximately 1% or less.

In step b), the preform can be obtained by casting or by pressing the feedstock or the mixture in a mold, with or without vibration, preferably by pressing.

During the firing in step f), the source of molten silicon infiltrates the preform and reacts ("reactive sintering") with some of its constituents, in particular with the carbon present due to impurities or intentional additions, to form a matrix and thus bind the boron carbide grains and the silicon carbide grains of the ceramic body.

According to a particular embodiment, the maximum firing temperature of the preform is between 1450° C. and 1800° C. under vacuum.

According to another particular embodiment, the maximum firing temperature of the preform is between 1700° C. and 2200° C., preferably between 1700° C. and 1900° C. under standard pressure of inert or neutral gas, for example under argon.

In the ceramic body according to the invention, the ceramic grains, preferably silicon carbide and boron carbide grains, can be bound by a matrix comprising or consisting essentially of a silicon phase without addition of other compounds.

The median diameter of the particles (or the median "size") of the particles constituting a powder, is given within the meaning of the present invention by a characterization of the particle size distribution, in particular by means of a laser particle sizer. The particle size distribution is conventionally characterized using a laser particle sizer according to the ISO 13320-1 standard. The laser particle sizer may, for example, be a Partica LA-950 from Horiba. Within the meaning of the present description and unless otherwise indicated, the median diameter of the particles refers to the diameter of the particles below which 50% by mass of the population is found, respectively. The "median diameter" or "median size" of an assembly of particles, in particular of a powder, refers to the $D_{50}$ percentile, i.e. the size that divides the particles into first and second populations of equal volume, these first and second populations only comprising particles having a size greater than or less than the median size, respectively.

In one embodiment, the starting feedstock contains a binder and/or a lubricant and/or a surfactant and/or a dispersant. In one embodiment, the starting feedstock contains a binder and a dispersant.

Mixing is carried out so as to obtain a high degree of uniformity of distribution of the various elements, it being possible to adjust the mixing time in order to achieve this result.

Preferably, the mixing of the initial reactants is carried out in a jar mill, the mixing time being longer than. 15 hours. A mixing time of 24 hours is highly suitable. Once the mixture has been obtained, it may be atomized or granulated, for example by freeze granulation, in order to obtain granules preferably of about 50 to 100 micrometers in diameter that will be shaped, for example by pressing, so as to obtain a ceramic preform. Other shaping techniques may be used, such as injection or slip casting. Shaping is preferably carried out by pressing, preferably uniaxial pressing. After shaping, the preform may be machined.

Preferably, the elemental oxygen content of the silicon carbide powders and/or boron carbide powders is lower than 2%, preferably lower than 1.6%, preferably lower than 1.4%, preferably lower than 1.2%, preferably lower than 1%, or lower than 0.7%, or lower than 0.5%, or even lower than 0.3% by weight. In one embodiment, the elemental oxygen content of these powders may be decreased before use by means of any technique known to those skilled in the art, for example acid washing.

The term "sintering" refers to a heat treatment via which the product forms a microstructure consisting of a granulate or granular fraction, the grains of which are held together by means of a matrix. A sintered product according to the invention comprises a matrix containing at least one metallic silicon phase or a metallic silicon alloy, obtained by sintering in a neutral atmosphere or under vacuum.

The term. "impurities" is understood to mean the unavoidable constituents, unintentionally and inevitably introduced with the raw materials or resulting from reactions with these constituents. The impurities are not necessary constituents, but merely tolerated constituents. Such an impurity consists in particular of silica, boron oxide, iron or oxides thereof. Without departing from the scope of the invention, it is possible to limit the silica impurity by washing the SiC powders or the sintering additive in a prior step and/or by adding carbon-containing additives to the initial mixture, to remove it during sintering.

FIG. 1 is an image taken with a scanning microscope of a polished section of the hard material of example 1 according to the invention. The hard material comprises silicon carbide grains 1, boron carbide grains 2, bound by a matrix comprising a metallic silicon phase 3.

EXAMPLES

The following examples are given purely by way of illustration and do not limit, under any of the described aspects, the scope of the present invention.

In all the examples which follow, ceramic parts in the form of plates having a 100 m×100 mm format with a thickness of 7 to 10 mm were initially produced by pressing a mixture, the formulations of the various examples of which have been reported in table 1 below. In the examples 1 according to the invention and the comparative examples 1 and 2, the boron carbide and silicon carbide powders were mixed beforehand with a PVA/PEG binder and the graphite powder so as to obtain granules after atomization according to techniques well known to those skilled in the art. The granules obtained after atomization which have a moisture content of less than 1% were shaped by uniaxial pressing at a pressure of 70 MPa, the parts were removed from the mold and then dried for 24 h at 110° C.

For comparative example 3, the mixture was prepared in the form of a slip cast in a plaster mold. After casting and hardening of the paste, the parts were removed from the mold and then dried for 24 h at 110° C.

The parts were then introduced into a furnace for firing at 1700° C. under vacuum, at a pressure below 20 torr. The silicon was introduced from a powder placed in contact with the green parts during furnace charging.

TABLE 1

| | invention exampie 1 | comparative example 1 | comparative example 2 | comparative example 3 |
|---|---|---|---|---|
| Composition of the initial mixture (% by weight) | | | | |
| SiC powder | | | | |
| $D_{50} = 80$ μm, $D_{10} = 53$ μm, $D_{90} = 120$ μm | 0 | 0 | 0 | 45 |
| SiC powder | | | | |
| $D_{50} = 11$ μm, $D_{10} = 2$ μm, $D_{90} = 15$ μm | 45.5 | 45.5 | 0 | 0 |
| SiC powder 0.1-5 μm | | | | |
| $D_{50} = 2.5$ μm, $D_{10} = 0.5$ μm, $D_{90} = 7$ μm | 0 | 0 | 45.5 | 50 |
| B4C powder | | | | |
| $D_{50} = 5$ um, $D_{10} = 2$ μm, $D_{90} = 9$ μm | 0 | 30.5 | 0 | 0 |
| B4C powder | | | | |
| $D_{50} = 1.5$ μm, $D_{10} = 0.5$ μm, $D_{90} = 5$ μm | 45.5 | 15 | 45.5 | 0 |
| Graphite powder | | | | |
| $D_{50} = 0.7$ μm, $D_{10} = 0.4$ μm, $D_{90} = 1.0$ μm | 9 | 9 | 9 | 5 |
| total minerals % | 100 | 100 | 100 | 100 |
| % added water relative to the mass of minerals | | +50% (before granulation) | | +18% |
| Added binder + dispersant | | +2.5% (before granulation) | | +0.5% |

For each embodiment, the properties of the ceramic body and the composition of the various constituent materials thereof are collated in table 2.

TABLE 2

| | invention example 1 | comparative example 1 | comparative example 2 | comparative example 3 |
|---|---|---|---|---|
| Body/ceramic material characteristics after firing | | | | |
| Microstructural characteristics (vol % of the product excluding porosity) | | | | |
| Fraction of boron carbide grains* >30 μm | <1 | <1 | <1 | <1 |
| Fraction of silicon carbide grains* >30 μm | <1 | <1 | <1 | 29 |
| Fraction of boron carbide grains* ≥5 μm and ≤30 μm | <1 | 8 | <5 | <1 |
| Fraction of silicon carbide grains* ≥5 μm and ≤30 μm | 45 | 40 | 5 | 20 |
| Fraction of boron carbide grains* <5 μm | 25 | 15 | 22 | <1 |
| Fraction of SiC grains* <5 μm | 5 | 8 | 42 | 39 |
| Volume fraction metallic matrix | remainder | remainder | remainder | remainder |
| Porosity % | <1 | <1 | <1 | <1 |
| Bulk density g/cm³ | 2.76 | 2.74 | 2.74 | 3.10 |
| X-ray diffraction analysis (vol %) | | | | |
| Silicon carbide SiC (α and β forms) | 50 | 48 | 48 | 88 |
| Boron carbide phase, $B_{12}$ (B, C, Si)$_3$ | 24 | 7.5 | 24 | ND** |
| Boron carbide phase, $B_4C$ | ND** | 14.5 | ND** | ND** |
| Metallic Si | 25 | 30 | 27 | 12 |
| Free carbon | <1 | <1 | <1 | <1 |

*equivalent diameter of grains
**not detectable

For each example, eight ceramic plates obtained according to the process described above having a surface density of 22.5 kg/m² (±0.5 kg/m²) were adhesively bonded to metal plates of 7020 T6 aluminum of 200 m×200 m×5 mm.
The surface density $\rho_{at}$ is calculated according to the following formula $\rho_{at}=t\times\rho_v$ where:
- $\rho_{at}$ the surface density expressed is kg/m²
- t is the thickness of the plate, expressed in mm,
- $\rho_v$ is the bulk density expressed in kg/dm³ typically measured according to ISO 18754.

Each ceramic-metal assembly was shot from a distance of 15 meters with a 7.62×51 P80 (steel core) ammunition at various speeds. A graph representing the degree of impact or perforation (total protection at complete perforation) as a function of the impact speed was produced for all the examples. From this graph, it is determined for each example the median velocity V50 starting from which the probability of perforation is 50%. A velocity greater than 700 m/s, taking into account this type of ammunition, is considered satisfactory. A high velocity corresponds to a ballistic performance which is inversely proportional to the surface density.

The ballistic properties of the final armor plate are collated in table 3 below:

TABLE 3

|  | invention example 1 | comparative example 1 | comparative example 2 | comparative example 3 |
|---|---|---|---|---|
| Ballistic tests | | | | |
| Median velocity $V_{50}$ (m/s) for a surface density of 22.5 kg/dm² | 820 | 790 | 795 | 760 |

The results grouped together in table 3 indicate that the choice of material used to manufacture an armor-plating component, i.e. of which the volume fractions of boron carbide grains, of silicon carbide grains and of the silicon-based metallic phase is in accordance with the present invention, leads to improved antiballistic performance (higher velocity $V_{50}$, at equal surface density).

The invention claimed is:

1. An antiballistic armor-plating component, comprising a ceramic body made of a material comprising, as percentages by volume:
    between 35% and 55% of silicon carbide,
    between 20% and 50% of boron carbide,
    between 15% and 35% of a metallic silicon phase or of a metallic phase comprising silicon,
and wherein, as percentages by volume of said material:
    the boron carbide grains with an equivalent diameter greater than 30 micrometers represent less than 5%,
    the boron carbide grains with an equivalent diameter less than 5 micrometers represent more than 15% and less than 35%,
    the silicon carbide grains with an equivalent diameter greater than 30 micrometers represent less than 5%, and
    the silicon carbide grains with an equivalent diameter greater than or equal to 5 micrometers and less than or equal to 30 micrometers represent between 35% and 55%.

2. The armor-plating component as claimed in claim 1, wherein said ceramic body is monolithic and has an impact area greater than 100 cm², a thickness greater than 3 mm and a bulk density less than 3.0 g/cm³.

3. The armor-plating component as claimed in claim 1, wherein the silicon carbide grains with an equivalent diameter greater than or equal to 5 micrometers and less than 30 micrometers represent more than 40% by volume of said material.

4. The armor-plating component as claimed in claim 1, wherein the boron carbide grains with an equivalent diameter less than 5 micrometers represent between 20% and 30% by volume of said material.

5. The armor-plating component as claimed in claim 1, wherein the boron carbide grains with an equivalent diameter greater than or equal to 5 micrometers represent less than 10% by volume of said material.

6. The armor-plating component as claimed in claim 1, wherein the boron carbide grains with an equivalent diameter between 5 and 30 micrometers, limits included, represent less than 10% by volume of said material.

7. The armor-plating component as claimed in claim 1, wherein the silicon carbide grains with an equivalent diameter less than 5 micrometers represent less than 10% by volume of said material.

8. The armor-plating component as claimed in claim 1, wherein the free carbon content is less than 1% by volume of said material.

9. The armor-plating component as claimed in claim 1, comprising:
    boron carbide grains and
    silicon carbide grains and
    a matrix binding said grains,
    said matrix comprising at least a metallic silicon phase or a metallic phase comprising silicon.

10. The armor-plating component as claimed in claim 1, wherein the silicon carbide grains with an equivalent diameter greater than or equal to 5 micrometers are in alpha (α) crystallographic form.

11. The armor-plating component as claimed in claim 1, wherein the proportion by volume of $B_4C$ represents less than 20% of the boron carbide content of said material.

12. The armor-plating component as claimed in claim 1, wherein the boron carbide is present in the form of a $B_{12}(B,C,Si)_3$ phase.

13. The armor-plating component as claimed in claim 1, wherein the boron carbide, the silicon carbide and the metallic silicon or the metallic phase comprising silicon together represent more than 75%, by volume, of said material.

14. The armor-plating component as claimed in claim 1, wherein, by volume of said material:
    the silicon carbide content of said material is greater than 35% and less than 55%,
    the boron carbide content is greater than 20% and less than 50%,
    the content of metallic silicon or of the metallic phase comprising silicon is greater than 15% and less than 35%,
    the boron carbide grains with an equivalent diameter greater than 30 micrometers represent less than 5%,
    the boron carbide grains with an equivalent diameter less than 5 micrometers represent more than 15% and less than 35%,
    the silicon carbide grains with an equivalent diameter greater than or equal to 5 micrometers and less than or equal to 30 micrometers represent between 35% and 55%,
    the silicon carbide grains with an equivalent diameter greater than 30 micrometers represent less than 5%, more than 90% of the grains, by volume of said material, have an equivalent diameter less than 30 micrometers, more than 80% of grains with an equivalent diameter less than 5 micrometers are boron carbide grains, more than 80% of grains with an equivalent diameter greater than or equal to 5 micrometers are silicon carbide (SiC) grains.

15. The armor-plating component as claimed in claim 1, wherein the ceramic body has a mass-to-area ratio, or surface density, measured in kg/m², of less than 100.

16. The armor-plating component as claimed in claim 1, wherein the ceramic body is chosen from a plate, a chest protector, a helmet, a bodywork element of a vehicle, a tube.

17. The armor-plating component as claimed in claim 1, comprising a ceramic body made of a material, provided on an inner face thereof or face opposite the impact face with an energy-dissipating back coating, made of a material of lower hardness than that of the material constituting the ceramic body, wherein the material constituting the back coating is chosen from polyethylenes PE, glass or carbon fibers, aramids, metals or alloys thereof or steel.

18. The armor-plating component as claimed in claim 17, wherein the ceramic body-back coating assembly is surrounded by an envelope of a confining material.

19. The armor-plating component as claimed in claim 18, wherein the material constituting the envelope is chosen from polyethylenes PE, glass or carbon fibers, aramids, metals or steel.

20. A process for manufacturing the ceramic body of the armor-plating component as claimed in claim 1, the process comprising:

a) preparing a starting feedstock including:
  at least one powder of boron carbide particles, of which the median diameter of the particles is between 0.1 and 10 micrometers,
  a powder of silicon carbide particles, of which the median diameter of particles is between 5 and 30 micrometers,
  a carbon precursor of which the median diameter is less than 1 micrometer,
  an aqueous solvent,
  optionally shaping additives,
b) shaping the starting feedstock into the form of a preform;
c) removal from the mold after setting or drying;
d) optionally, drying the preform, until a residual moisture content is comprised between 0 and 0.5% by weight;
e) loading the preform, in contact with a source of silicon or a silicon alloy into a furnace;
f) firing the preform under an inert atmosphere or under vacuum so as to infiltrate the preform with the source of molten silicon and consolidate it.

21. A method comprising providing an antiballistic protection for a person or for a land, sea or air vehicle or for a fixed installation manufactured with an antiballistic armor-plating component as claimed in claim 1.

22. The armor-plating component as claimed in claim 1, wherein the metallic silicon phase and the metallic phase comprising silicon each comprise more than 80% of silicon atoms.

23. The armor-plating component as claimed in claim 22, wherein the metallic silicon phase and the metallic phase comprising silicon each comprise more than 90% of silicon atoms.

* * * * *